United States Patent [19]

Wolfe

[11] 4,274,857
[45] Jun. 23, 1981

[54] TREATING COVERS FOR PRESS BENDING MOLDS, AND METHOD OF PRESS BENDING GLASS SHEETS

[75] Inventor: Terry L. Wolfe, Tyrone, Pa.

[73] Assignee: PPG Industries, Inc., Pittsburgh, Pa.

[21] Appl. No.: 90,727

[22] Filed: Nov. 2, 1979

[51] Int. Cl.³ .............................................. C03B 23/03
[52] U.S. Cl. ........................................ 65/26; 65/106; 65/273; 65/374 RM
[58] Field of Search ..................... 65/24, 26, 106, 273, 65/374 R, 374 RM

[56] References Cited

U.S. PATENT DOCUMENTS

| 2,560,599 | 7/1951 | Ryan .................................. 65/374 R |
| 3,420,652 | 1/1969 | Seymour .............................. 65/287 |
| 3,492,109 | 1/1970 | Robinson et al. ...................... 65/193 |
| 3,713,798 | 1/1973 | Stilley et al. ......................... 65/106 |
| 3,783,013 | 1/1974 | Seeman ............................... 117/127 |
| 3,853,525 | 12/1974 | Gorman ............................. 65/374 |
| 4,097,257 | 6/1978 | Davey ................................. 65/26 |

FOREIGN PATENT DOCUMENTS 544512  4/1942  United Kingdom ..................... 65/26

Primary Examiner—Arthur D. Kellogg
Attorney, Agent, or Firm—Donald Carl Lepiane; Edward I. Mates

[57] ABSTRACT

Applying a boron nitride composition to a flexible fiber glass fabric cover for a press bending mold for shaping heat-softened glass sheets having a portion painted with a composition consisting essentially of a finely divided frit-pigment mixture by impregnating at least the portion of the cover that engages the painted portion of the glass sheet reduces the likelihood of marking the press bent glass sheet in unwanted regions. In addition, such impregnation facilitates removing the press bending molds from the press bent glass sheet when the press bending molds are separated after engaging the heat-softened glass sheet.

8 Claims, No Drawings

TREATING COVERS FOR PRESS BENDING MOLDS, AND METHOD OF PRESS BENDING GLASS SHEETS

BACKGROUND OF THE INVENTION

1. Field of the Invention

The present invention relates generally to the art of press bending glass sheets and more particularly to the art of press bending glass sheets having a printed portion.

Automobile backlights are typically provided with a painted border portion to enable them to be mounted flush with a curved frame of an automobile. In such so called "flush mounting," the painted border portion conceals the frame without requiring metal strips or the like to conceal attachment elements that secure the backlight to the frame.

In the glass industry, tempered backlights to be mounted flush with the automobile frame so that the shape and outline of the curved backlight merges with the automobile frame, are fabricated by first applying the paint to the desired portion or portions of the glass sheet, gripping the painted glass sheet by tongs, conveying the tong-gripped glass sheets through a tunnel-like furnace where each glass sheet is heated to a temperature sufficient for tempering, engaging the tong-gripped glass sheets between a pair of press bending molds having complementary shaping surfaces that impress onto the heat-softened glass sheet a desired shape and then separating the molds and passing the press bent glass sheet through a cooling area where blasts of tempering medium, such as cold air, are applied sufficiently rapidly over the opposite major glass sheet surfaces to impart at least a partial temper in the glass.

When glass sheets are tempered, they are heated to above the stain point of the glass, and even as high as a temperature approaching the glass softening point. After the glass attains a temperature sufficient for tempering, it is chilled rapidly. Stresses are established temporarily in the glass during this rapid cooling. These stresses may become so severe as to cause the glass sheet to fracture during the tempering operation. Glass fracturing during tempering has been reduced to some extent by providing the press bending molds with covers of flexible fiber glass that insulate the relatively hot glass sheets from the relatively cold press bending molds. Such insulation reduces the tendency of the press bent glass sheet to develop steep thermal gradients due to non-uniform contact with the press bending molds. These steep thermal gradients have been associated with glass sheet breakage during the fabrication of bent tempered glass sheets by press bending followed by rapid chilling.

Unfortunately, when press bending molds provided with flexible fiber glass covers are used to shape glass sheets having a painted portion, the paint tends to transfer from the glass sheet to the cover. Paint on the cover is likely to transfer to a subsequent glass sheet in a mass production press bending operation. Sometimes, the paint is deposited in an area where the bent, tempered backlight is desired to be free of any defect such as a paint mark.

Consequently, it would be desirable to be able to avoid the transfer of paint from the painted portion of a glass sheet to be press bent and tempered to the cover for the press bending mold. Since other bent tempered glass sheets are provided with painted portions other than in the border region, it would be equally desirable to avoid the application of paint marks to glass sheets to be press bent and tempered regardless of the location of the desired paint application.

In addition to the above-described defects relating to the marking of glass sheets, another problem encountered in the press bending operation is the difficulty of separating the bent glass from the press bending molds when the latter separate after having sandwiched the glass sheet therebetween to impress the desired shape into the glass sheet by pressurized engagement. The press bent glass sheet tends to stick to one of the press bending molds when the molds separate. Usually, the press bent glass sheet remains against the protruding portion of the convex press bending mold when the press bending molds have complementary shaping surfaces of convex and concave configuration. It would be desirable to overcome this problem, because any delay in transferring the glass sheet from the press bending molds to the cooling area reduces the maximum temper obtainable in the press bent glass sheet.

2. Description of Patents of Interest

U.S. Pat. No. 2,560,599 to Ryan discloses press bending molds comprising fiber glass fabric impregnated with plastic or resinous filler.

U.S. Pat. No. 3,148,968 to Cypher and Valchar discloses press bending molds having covers of knit fiber glass cloth composed of texturized yarn.

U.S. Pat. No. 3,420,652 to Seymour discloses a cover of fiber glass cloth supporting an embedded wire fabric in an area that faces a decorative painted strip on a glass sheet to be bent by press bending.

U.S. Pat. No. 3,713,798 to Stilley, Wagner and Kely discloses treating a fiber glass cloth cover of a press bending mold with a dispersion containing a Werner complex salt to improve the durability of the cover.

In U.S. Pat. No. 3,492,109 to Robinson et al, boron nitride is disclosed for use in glass engaging rolls of a float glass tank.

In U.S. Pat. No. 3,783,013, Seeman discloses coating metal glassware molds with a dispersion of 12 to 53 percent by weight monoaluminum phosphate and 47 to 88 percent by weight boron nitride.

An asbestos roll with a boron nitride coating found to prolong roll life and to minimize deformation of the roll and adhesion to the glass surface is disclosed in U.S. Pat. No. 3,853,525 to Gorman. The roll is prepared by adhering asbestos discs together on a mandrel, spraying on a solution of boron nitride, air drying for one to ten hours at room temperature to 200° F. (93° C.), then baking at 200° to 1500° F. (93° to 815° C.) for two to six hours before installing the roll in a glass producing apparatus.

SUMMARY OF THE INVENTION

The present invention involves treating covers for molds for press bending glass sheets and press bending molds containing covers so treated. According to the present invention, the flexible cover of fiber glass fabric used with a press bending mold contains at least a portion that is impregnated with a dispersion of a boron nitride composition. Preferably, the impregnated portion faces a painted portion of the glass sheet to be shaped by press bending.

Impregnating at least a portion of the flexible fiber glass cover with a boron nitride composition reduces the tendency of paint from the painted portion of the glass sheet to transfer from the sheet to the cover during press bending so that there is less tendency for glass sheets to develop paint marks in areas where paint marks are not desired. In addition, the boron nitride impregnation seems to facilitate the separation of the press bending molds from the press bent glass sheets when the press bending molds separate from one another after shaping the heat-softened glass sheet by press bending.

If desired, the remainder of the covers for the press bending molds that do not engage painted portions of the glass sheet may be impregnated with the boron nitride composition. However, because of relative costs, the remainder of the covers may be impregnated with a silicone composition or Werner complex compositions or the like.

The benefits of the present invention will be better understood in the light of a description of preferred embodiments that follows.

DESCRIPTION OF PREFERRED EMBODIMENTS

Molds for press bending glass sheets are preferably made according to those described in U.S. Pat. No. 3,367,764 to Seymour and comprise a relatively flexible metal plate having a shaping surface complementary to another mold of a pair of molds, a relatively rigid member and means connecting said plate and said member in such a manner that the shape of the plate may be modified. The plate is more rigid than a heat-softened glass sheet to be press bent. A cover of flexible fiber glass cloth is supported in unwrinkled condition against the shaping surface. Preferably, the cover is of the tye of knit fiber glass cloth composed of texturized yarn of the type covered in U.S. Pat. No. 3,148,968 to Cypher and Valchar.

According to the present invention, a portion of the cover of a press bending mold that engages a painted portion of a glass sheet during press bending is impregnated with a composition containing boron nitride. A brush, roller, spray gun or the like may be used to apply the boron nitride composition. Spraying is preferred where feasible because it produces a very uniform application to the fiber glass cover.

Aqueous boron nitride compositions useful according to the present invention are commercially available from Carborundum Corporation under the trademark COMBAT®. These compositions are typically gels of boron nitride which contain a high temperature inorganic binder such as aluminum oxide, magnesium silicate or zirconium oxide in aqueous medium. Preferred compositions include Type S boron nitride gel of the Carborundum COMBAT® series containing aluminum oxide as well as Type V boron nitride gel that contains magnesium silicate.

In a method for treating covers for press bending molds for press bending glass sheets having painted portions, the covers are contacted with an aqueous solution comprising about 4 to 5 volumes of water per volume of concentrated boron nitride gel in the areas of the cover that engage the painted portions of the cover. As soon as the coating has set, the time required varying inversely with the temperature, the press bending process can be performed. The remainder of the cover may be treated with the boron nitride composition also. However, to control the cost of the materials used to impregnate the cover, other impregnating compositions such as silicones and Werner complex salt compositions may be applied to the remainder of the cover.

The black paint used to decorate the flat glass sheets is applied by silk screening a composition containing about 50 parts by weight of finely divided lead-borosilicate glass frit and about 12 parts by weight of a black pigment consisting essentially of a finely ground, washed powder of a cobalt-chromium-iron composition or a copper-chromium composition in an oil vehicle onto the flat glass sheet and baking the decorated flat glass sheet for a few minutes at about 400° F. (204° C.) to remove the volatile oil vehicle. The painted glass sheet is gripped by tongs. The tong-gripped glass is passed through a tunnel-type furnace where the glass is heated to a temperature suitable for tempering [about 1160° F. (627° C.) to about 1250° F. (667° C.)] prior to press bending. During this heating, the black paint consisting essentially of the finely divided frit and pigment fuses to the surface of the glass sheet undergoing heating.

Prior to the present invention, when glass sheets so decorated and heated were press bent with molds having fiber glass covers impregnated with a silicone rubber that vulcanizes at room temperature such as dimethyl silicone sold as General Electric RTV-60 silicone, some of the paint transferred to the cover during press bending. This transferred paint was sometimes transferred in undesirable areas of subsequently treated glass sheets.

The present invention will be further understood from the description of specific examples which follow.

EXAMPLE I

For use on a bent tempered backlight production line, the fiber glass fabric covers for a pair of opposing press bending molds having shaping surfaces of complementary contour are impregnated by contacting them with an aqueous composition comprising 1 part of a boron nitride gel comprising 60 percent water and 4 parts additional water in those portions that engage the painted portions of glass sheets that are press bent and tempered to produce bent tempered backlights. The boron nitride gel is commercially available from Carborundum Corporation as COMBAT® Type S coating composition and comprises 85 parts boron nitride to 15 parts aluminum oxide. The aqeous composition is applied with long handled brushes. The remainder of the covers are impregnated with a silicone composition such as General Electric's composition identified as RTV-60.

When a flat glass sheet is brought into contact with the boron nitride covers of the press bending molds while the glass is heat-softened, virtually no paint transfers to the mold covers.

EXAMPLE II

Fiber glass covers for press bending molds are impregnated as in Example I in the parts that engage the painted portions of heat-softened glass sheets to be fabricated into bent tempered backlights with an aqueous composition comprising 5 volumes of water per volume of a boron nitride gel available from Carborundum Corporation as COMBAT® Type V which differs from Type S in that magnesium silicate, rather than aluminum oxide, is used in a ratio of 92 parts boron nitride to 8 parts magnesium silicate. The remainder of the covers are impregnated with RTV-60 silicone available from General Electric Again, a boron nitride coating is formed which substantially reduces marking of the glass with paint in those areas desired to be kept clear of any paint when the press bending molds provided with covers so treated are used to press bend glass sheets having a border of black paint.

EXAMPLES III AND IV

Cover impregnation techniques using the boron nitride gels of Examples I and II, respectively, are used to impregnate the entire fiber glass covers. Painted glass sheets press bent with press bending molds having fiber glass fabric covers so treated produce bent glass sheets that show no paint transfer marks on unwanted areas on inspection after tempering.

The mold covers treated as in Example I, II, III or IV do not show any paint mark-off after a trial run under production conditions.

While the boron nitride gels in the specific examples recited are dispersed in water, it is understood that other liquid vehicles such alcohols and other organic solvents may be substituted for water as a vehicle for applying the boron nitride gel. Water was selected because of economy and health reasons. Water is relatively free of carcinogenic properties compared to other liquids.

The form of this invention described in this specification represents illustrative embodiments presently preferred. It is understood that various changes may be made without departing from the gist of the invention as defined in the claimed subject matter which follows.

I claim:

1. An apparatus for shaping a glass sheet having a portion of at least one surface painted wherein the apparatus is of the type having at least one shaping mold having a shaped surface; a cover of flexible fiber fabric on the shaping surface of the at least one shaping mold, the cloth having a normal dimensional yielding ability and means for transferring the sheet to the at least one shaping mold, the improvement comprising:
    at least the portion of the fabric expected to contact the painted portion of the sheet coated with a boron nitride composition with a thickness sufficient to prevent transfer of the paint from the painted portion of the sheet to the cover and at a thickness to permit the cloth to maintain its normal dimensional yielding ability.

2. The apparatus as set forth in claim 1 wherein the at least one mold is a first pressing mold and further including:
    a second pressing mold having a shaping surface complementary to the shaping surface of the first pressing mold;
    a cover of flexible fiber fabric on the shaping surface of the second pressing mold;
    means for moving the first mold and second pressing molds relative to one another to press shape the sheet therebetween; and
    said boron nitride composition coated on at least portions of the fabric on the first and second pressing molds expected to contact the painted portions of the sheet.

3. The apparatus as set forth in claim 1 or 2 wherein the remaining portions of the cover not coated with said boron nitride composition is coated with a silicone.

4. A method of shaping a glass sheet having a portion of at least one surface painted, comprising the steps of:
    providing at least one shaping mold having a flexible fiber fabric over the shaping surface, the fabric having a normal dimensional yielding ability;
    coating at least the portion of the fabric to contact the painted portion of the sheet with a boron nitride composition with a thickness sufficient to prevent transfer of the paint from the painted portion of the sheet to the fabric and at a thickness to permit the fabric to maintain the normal dimensional yielding ability;
    heating the sheet to its shaping temperature;
    positioning the heated sheet on the fabric with the painted portion of the sheet overlying the coated portion of the fabric;
    shaping the sheet; and
    removing the sheet from the shaping mold.

5. The method as set forth in claim 4 wherein said shaping step is accomplished by press bending the sheet between a pair of shaping molds each having a shaping surface complementary to one another.

6. The method as set forth in claim 4 or 5 wherein said coating step further includes:
    coating remaining portions of the fabric not having the boron nitride composition coating with a silicone.

7. The method as set forth in claim 6 wherein the glass sheet is an automotive window.

8. The apparatus as set forth in claim 3 wherein the glass sheet is an automotive window.

* * * * *